United States Patent Office 3,068,300
Patented Dec. 11, 1962

3,068,300
OXIDIZED POLYMER WITH A LOW VISCOSITY
Neville Leverne Cull, Baker, and Donald Dunwody Dunlop, Baton Rouge, La., and Anthony H. Gleason, Scotch Plains, N.J., assignors to Esso Research and Engineering Company, a corporation of Delaware
No Drawing. Filed Aug. 24, 1959, Ser. No. 835,418
13 Claims. (Cl. 260—669)

This invention relates to a method for oxidizing a polydiolefin, and more particularly to the improved end product therefrom with a relatively low viscosity.

It is known that a polymer of a $C_4$ to $C_6$ conjugated diolefin, prepared in the presence of an alkali metal catalyst, can be air blown to incorporate oxygen in its structure. In the past, it has been possible to modify the polymer by using a packed tower for the oxidation procedure. However, this has not been entirely acceptable since both the acid content and viscosity of the air blown polymer were relatively high; consequently, this end product has not been suitable for certain commercial aspects.

It has previously been advantageous to introduce at least 8% oxygen into the structure of a polydiolefin by air blowing the polymer in a kettle type reactor at a temperature of about 235° F. and a pressure of about 50 p.s.i.g. This procedure has decreased the acid content and the viscosity in the end product. However, the viscosity is still above 1.0 poise at 37% solids; therefore, the final oxidized polymer cannot be effectively employed where a lower viscosity is required from an economical standpoint.

It has now been discovered that the viscosity can be decreased to below 1.0 poise at 37% concentration by oxidizing the polymer in a solvent mixture with an alkanol therein. Thus, in accordance with one embodiment of this invention, a polymer of a $C_4$ to $C_6$ conjugated diolefin is prepared in the presence of an alkali metal catalyst, e.g., sodium. This polymer (having a viscosity of about 0.30 poise in Solvesso at 37% concentration) is then dissolved in a solvent mixture comprising a hydrocarbon solvent and an alkanol. The solution therefrom is subsequently blown with air in a kettle type reactor zone to provide an end product with a relatively low viscosity, e.g., 0.4 to 0.9 poise at 37% solids. The polymers within the purview of this invention are prepared from diolefins, particularly those which are conjugated and have 4 to 6 carbon atoms per molecule, such as butadiene, hexadiene, isoprene, dimethyl butadiene, piperylene, and methyl pentadiene. Diolefins may be used which may be copolymerized with minor amounts of ethylenically unsaturated monomers such as styrene, or with styrenes having alkyl groups substituted on the ring, e.g., paramethyl styrene, dimethyl styrene, etc. A preferred diolefin polymeric oil is one prepared by reacting 75 to 100 parts of butadiene and 25 to 0 parts of styrene in the presence of metallic sodium catalyst. Polymerization is carried out in a reaction diluent at temperatures from about 25° C. to 105° C. with about 0.5 to 5 parts of finely divided sodium per 100 parts of monomers used. The diluent used in the polymerization must boil between about −15° C. and 200° C., in amounts ranging from 100 to 500 parts per 100 parts of monomers; preferred diluents are aliphatic hydrocarbons such as solvent naphtha or straight-run mineral spirits such as Varsol. In order to obtain a water white product, a codiluent, about 10 to 45 parts per 100 parts of monomers, may also be used, consisting of a $C_4$ to $C_8$ aliphatic ether or cyclic ethers and polyethers other than those having a —O—C—O— grouping; particularly useful ethers are dioxane 1,4 and diethyl ether. Finally, it is beneficial to use about 5 to 35 weight percent, based on sodium, of an alcohol such as methanol, isopropanol, or an amyl alcohol in order to overcome the initial induction period. The resulting product may vary in viscosity from 0.15 to 20 poises. The preparation of this oil in the presence of an alkali metal or peroxide catalyst is described in U.S. Patents 2,762,851 and 2,586,594, which are incorporated herein by reference.

The polymer oils heretofore described are then oxidized in a kettle-type reaction zone by blowing the polymer with air or oxygen, in the presence of a hydrocarbon solvent, and an alkanol. Examples of suitable hydrocarbon solvents include aromatic hydrocarbons, e.g., benzene, toluene, and xylene; aliphatic hydrocarbons, e.g., heptane, octane, and tetradecane; or combinations thereof, boiling up to about 250° C., preferably between 100° and 200° C. However, in accordance with this invention the viscosity is substantially decreased by incorporating an alkanol in the hydrocarbon solvent. Alkanols within the purview of this invention are those which have 4 to 10 carbon atoms, e.g., n-heptanol, 2-ethyl hexanol, decanol, and butanol. It should be noted that the alcohol is added before or during oxidation and not after the oxidation has been terminated. The preferred polymeric solution comprises 50 to 300 parts of the hydrocarbon solvent heretofore described and 10 to 200 parts of an alkanol per 100 parts of polymer. The oxidation can be carried out by blowing air or oxygen into the polymer with or without a catalyst. Suitable catalysts are organic salts of metals such as cobalt, lead, iron, and manganese. The naphthenates, octoates, and oleates are especially suitable. These catalysts are used in amounts ranging from 0.001% to 1.0%. Preferred compounds are the oxidized copolymers of 75 to 85% butadiene and 25 to 15% styrene with about 10 to 20% oxygen in the structure.

There are two other techniques for oxidation. Firstly, to dissolve the polymer in the hydrocarbon solvent, e.g., paraffin solvent; and add the alkanol shortly, e.g., 20 to 60 minutes after the oxidation procedure has been initiated. Secondly, the alkanol can be added after the oxidation has been well established but before completion, e.g., after 4 to 10% of oxygen has been incorporated in the polymeric structure.

In the present invention the oxidation of the polymer is generally performed in the kettle-stirred reactor at a temperature between 180° and 260° F., preferably 220–240, and a pressure between atmospheric pressure and 200 p.s.i.g.

Thus, the end product in the instant invention is an alkali metal polymer of a $C_4$ to $C_6$ conjugated diolefin with above 8% oxygen in its structure. A new composition has been formed with a viscosity of less than 1.0 poise, e.g., 0.4 to 0.9 poise.

The following examples are submitted to illustrate and not to limit this invention:

EXAMPLE I

A polymeric oil was provided from the compounds indicated herebelow:

| | Parts |
|---|---|
| Butadiene-1,3 | 80 |
| Styrene | 20 |
| Varsol [1] | 200 |
| Dioxane | 40 |
| Isopropanol | 0.2 |
| Sodium [2] | 1.5 |

[1] Straight-run mineral spirits: API gravity, 49.0; flash, 105° F.; boiling range, 150° to 200° C.; solvent power, 33–37 Kauri-Butanol value (reference scale: Benzene-100 K.B. value, n-heptane 25.4 K.B. value).
[2] Dispersed to a particle size of 10 to 50 microns by means of an Eppenbach homo-mixer.

The polymerization was performed at 50° C. in a 2-liter autoclave equipped with a mechanical agitator.

Complete conversion was obtained in 4.5 hours. The catalyst was destroyed and removed from the resulting crude product. Essentially all of the solvent was removed by stripping to give a product of essentially 100% NVM. The resulting product had a viscosity of 1.5 poise at 50% NVM in Varsol solution and the nonvolatile portion thereof had an average molecular weight of about 8,000.

Four polymeric solutions were prepared comprising the above copolymer and various amounts of a hydrocarbon solvent and an alcohol as indicated in Table I. These solutions were blown with oxygen for 3 hours at a temperature of 220° F. and at atmospheric pressure in the presence of 0.02 part of manganese as the naphthenate. The results are recorded herebelow:

Table I

| Solution # | Hydrocarbon Solvent | Pts.[1] | Alcohol | Pts.[1] | Percent Oxygen in Polymer | Viscosity[3] (poise) |
|---|---|---|---|---|---|---|
| 1 | Solvesso[2] | 186 | None | | 13.3 | 0.9 |
| 2 | do | 186 | do | | 14.0 | 0.9 |
| 3 | do | 186 | n-heptanol | 50 | 17.0 | 0.4 |
| 4 | do | 136 | 2-ethyl hexanol | 50 | 16.6 | 0.5 |

[1] Parts per 100 parts of polymer by weight.
[2] High percentage of aromatics with an API gravity of 30.2, a flash point of 118° C., and a boiling range of 322–351° F.
[3] 37% solids.

The example shows the advantages of using the combination of a hydrocarbon solvent and an alcohol. Further, the reduction in viscosity is not due to a solvency effect. This is demonstrated in Table II where the oxidized polymer, with 16% oxygen therein, was blown in Solvesso and then diluted as shown.

Table II

| Solution[a] | Solvent Mixture | | | | Viscosity (poise) | Percent Solids |
|---|---|---|---|---|---|---|
| | Hydrocarbon Solvent | parts | Alcohol | pts. | | |
| A | Solvesso | 100 | None | | 3.4 | 45 |
| B | do | 60 | Isopropyl | 40 | 2.3 | 45 |
| C | do | 60 | Ethyl hexanol | 40 | 3.7 | 45 |
| D | do | 60 | do | 40 | [b] 1.0 | 37 |

[a] Polymer in the various solvents is the copolymer of Example I with 16% oxygen therein.
[b] Compare with viscosity for #4, Table I.

EXAMPLE II

The copolymer of Example I and various amounts of a paraffinic solvent and an alcohol were combined to form polymeric solutions as indicated in Table III. (The units are parts by weight unless designated otherwise.) The solutions were blown with air in the presence of .01 weight percent of manganese naphthenate as the catalyst to incorporate 10% oxygen in the structure. The results are also shown in Table III herebelow:

Table III

| | 1 | 2 | 3 | 4 |
|---|---|---|---|---|
| Copolymer | 35 | 35 | 35 | 35 |
| n-Octane | 65 | 45 | 40 | |
| 2-ethyl hexanol | | 20 | 25 | 65 |
| Temperature (° F.) | 240–247 | 235–240 | 230–240 | 240–245 |
| Oxygen rate (Li/Hr.) | 12 | 12 | 12–18 | 18 |
| Pressure (p.s.i.g.) | 14.7 | 14.7 | 14.7 | 14.7 |
| Time (hrs.) | 1.95 | 1.75 | 3 | [b] 1.75 |
| NVM | 20 | 37 | 37 | 35 |
| Viscosity (strokes) | [a] 1 | .4 | .5 | [c] 1.5 |
| Percent oxygen in structure | 8–10 | 8–10 | 15–17 | 10–11 |

[a] Gelation—unable to strip to 37% NVM.
[b] .02 wt. percent of Mn naphthenate was required to initiate the run.
[c] Viscosity on feed .2–.3, difficult to run because not a true solution.

It is manifest from this example that above 8%, oxygen e.g., 10% can be incorporated in the copolymer by utilizing a paraffinic-alcohol solvent, and the solution therefrom has a relatively low viscosity of 0.4–0.5 poise. With a paraffinic solvent, it is necessary to add an alkanol to obtain 10 to 16% oxygen therein.

Having set forth the general nature and embodiments of the present invention, the true scope is particularly pointed out in the appended claims.

What is claimed is:

1. In a process of preparing an oxidized normally liquid diolefin polymer by polymerizing a $C_4$ to $C_6$ conjugated diolefin and subsequently oxidizing said diolefin with oxygen to an oxygen content of at least 8%, the improvement comprising carrying out the oxidation of the polymer in a solution comprising a mixture of a hydrocarbon solvent having a boiling point up to 250° C. and a $C_4$ to $C_{10}$ alkanol for a sufficient length of time to incorporate at least 8% oxygen into the polymer.

2. The process according to claim 1 in which the polymer is the homopolymer of butadiene.

3. The process according to claim 1 in which the polymer is a copolymer of butadiene with styrene.

4. The process according to claim 1 in which the pressure during the oxidation of the polymer is maintained between atmospheric pressure and 200 p s.i.g.

5. The process according to claim 1 in which the temperature during the oxidation of the polymer is maintained between 180 and 260° F.

6. The process according to claim 1 in which the hydrocarbon solvent is a paraffinic hydrocarbon.

7. The process according to claim 1 in which the hydrocarbon solvent is an aromatic hydrocarbon.

8. The process according to claim 1 in which the solution comprises 50 to 135 parts of a hydrocarbon solvent and 135 to 50 parts of an alkanol per 100 parts of polymer.

9. The process according to claim 1 in which the alkanol is selected from the group consisting of n-heptanol, 2-ethyl hexanol, n-butanol, and decanol.

10. An improved composition of matter comprising normally liquid oxidized polymer of a $C_4$ to $C_6$ conjugated diolefin containing at least 8% oxygen, said oxidized polymer having a maximum viscosity of 1.0 poise at 37% NVM and having been oxidized with oxygen to the said oxygen content while in a solution comprising a mixture of a hydrocarbon solvent having a boiling point up to 250° C. and a $C_4$ to $C_{10}$ alkanol the unoxidized polymer, from which the oxidized polymer is prepared, having an initial boiling point above 200° C.

11. The composition according to claim 10 in which the polymer is the homopolymer of butadiene.

12. The composition according to claim 10 in which the polymer is a copolymer of butadiene with styrene.

13. The composition according to claim 10 in which the viscosity is between 0.4 and 0.9 poise at 37% NVM.

References Cited in the file of this patent

UNITED STATES PATENTS 2,895,979    Segraves et al.    July 21, 1959

FOREIGN PATENTS 802,979    Great Britain    Oct. 8, 1958